United States Patent
Tsai et al.

(10) Patent No.: US 6,529,552 B1
(45) Date of Patent: Mar. 4, 2003

(54) METHOD AND A DEVICE FOR TRANSMISSION OF A VARIABLE BIT-RATE COMPRESSED VIDEO BITSTREAM OVER CONSTANT AND VARIABLE CAPACITY NETWORKS

(75) Inventors: Chun-Jen Tsai, La Jolla, CA (US); Osama Alshaykh, San Diego, CA (US); Mark R. Banham, San Diego, CA (US)

(73) Assignee: PacketVideo Corporation, San Diego, CA (US)

( * ) Notice: Subject to any disclaimer, the term of this patent is extended or adjusted under 35 U.S.C. 154(b) by 0 days.

(21) Appl. No.: 09/504,359

(22) Filed: Feb. 15, 2000

Related U.S. Application Data

(60) Provisional application No. 60/120,230, filed on Feb. 16, 1999.

(51) Int. Cl.[7] .................................................. H04N 7/18
(52) U.S. Cl. ............................. 375/240.05; 375/240.03
(58) Field of Search ....................... 375/240.02–240.07

(56) References Cited

U.S. PATENT DOCUMENTS

| | | | | |
|---|---|---|---|---|
| 5,953,506 A | * | 9/1999 | Kalra et al. ................. 345/428 |
| 6,057,884 A | * | 5/2000 | Chen et al. ..................... 348/42 |
| 6,269,078 B1 | * | 7/2001 | Lakshman et al. ........... 370/230 |
| 6,289,129 B1 | * | 9/2001 | Chen et al. .................. 382/232 |
| 6,317,131 B2 | * | 11/2001 | Basso et al. ................. 345/473 |
| 6,343,098 B1 | * | 1/2002 | Boyce .................... 375/240.03 |

* cited by examiner

Primary Examiner—Andy S. Rao
(74) Attorney, Agent, or Firm—Patents+TMS, P.C.

(57) ABSTRACT

A method and device for producing and delivering constant quality digital video bitstreams over channels of any bit-rate and variability are provided. The method and device may be applicable to any standardized video coding system, but preferably within the MPEG-4 standard. For constant capacity networks, the method and the device re-distribute the coded bits in a constant-quality variable bit-rate bitstream to construct a constant bit-rate bitstream. For variable capacity networks, the method and the device achieve constant quality as described by a metric that incorporate both spatial and temporal visual quality. The method and the device incorporate user, network, and channel parameters in controlling the bit-rate while encoding video material.

19 Claims, 5 Drawing Sheets

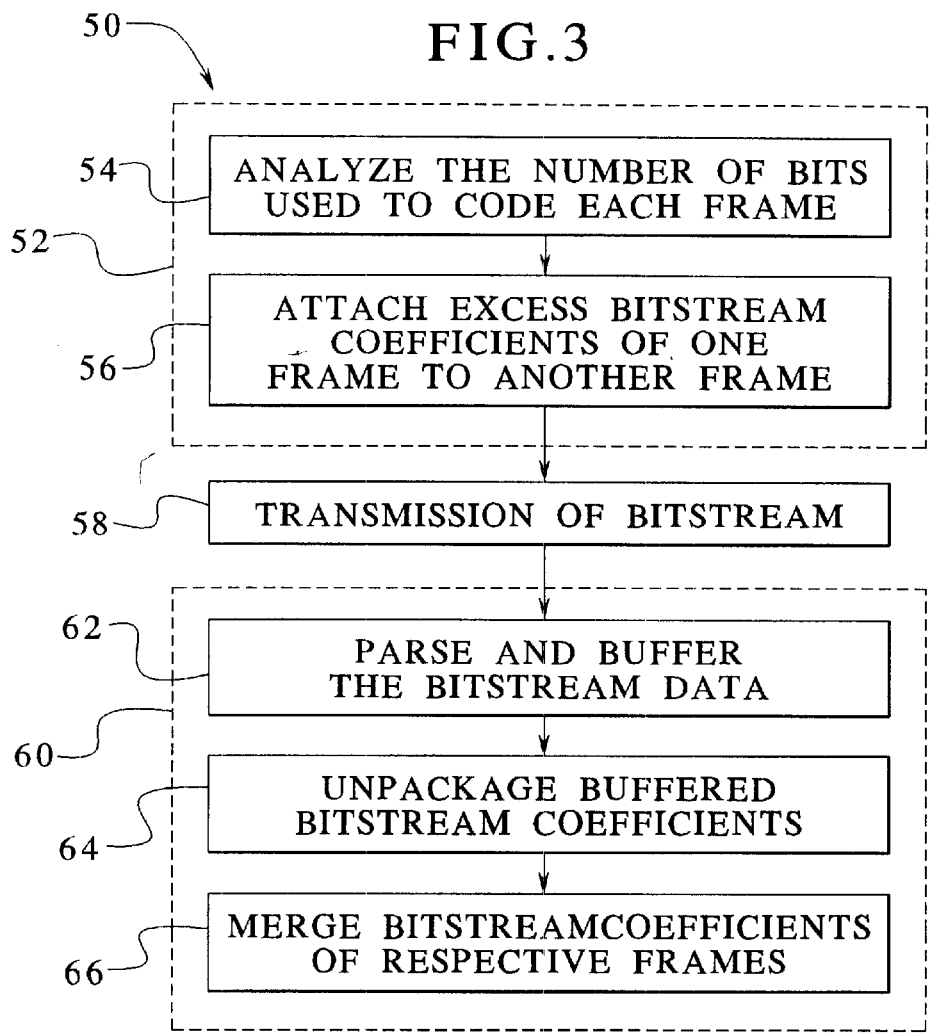
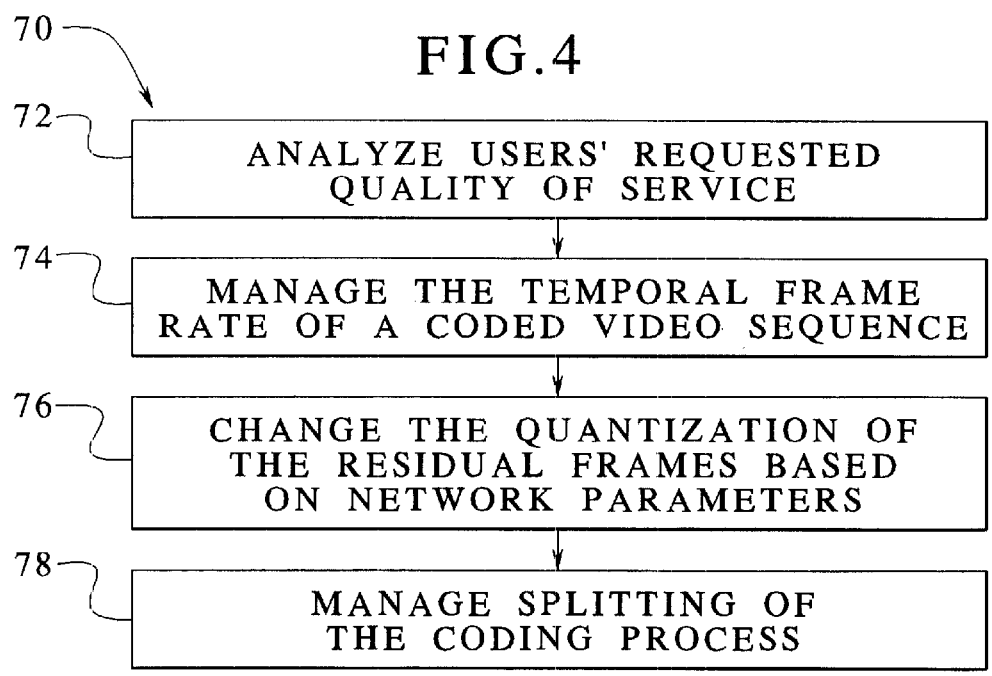

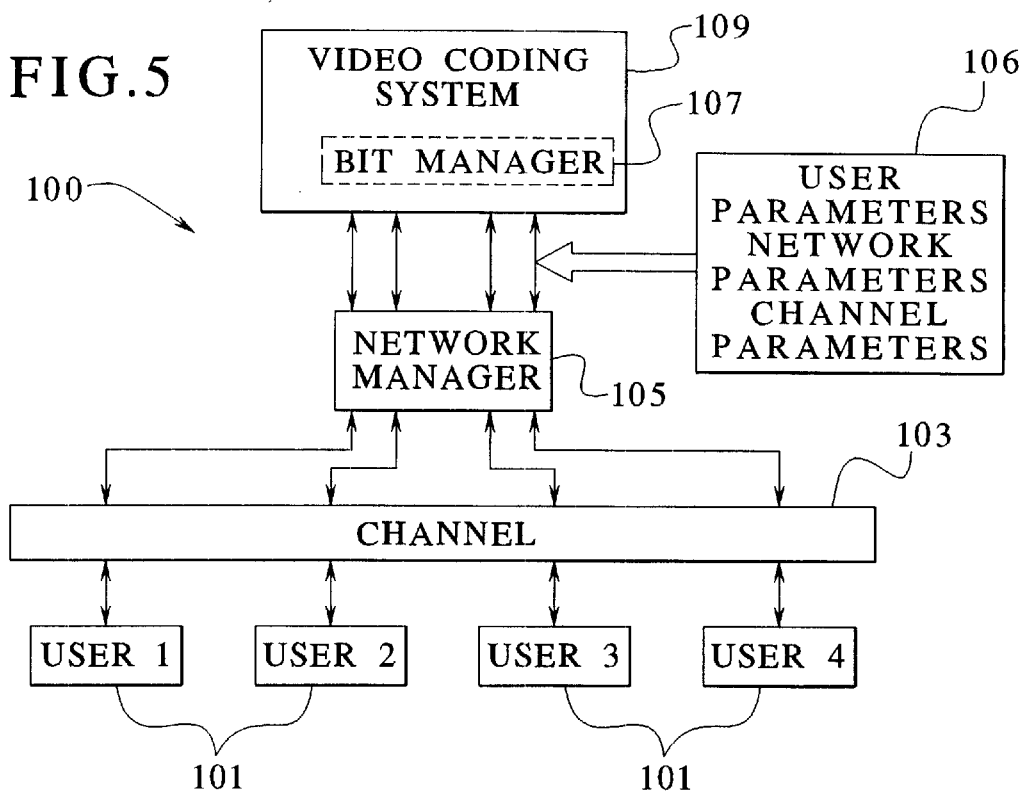
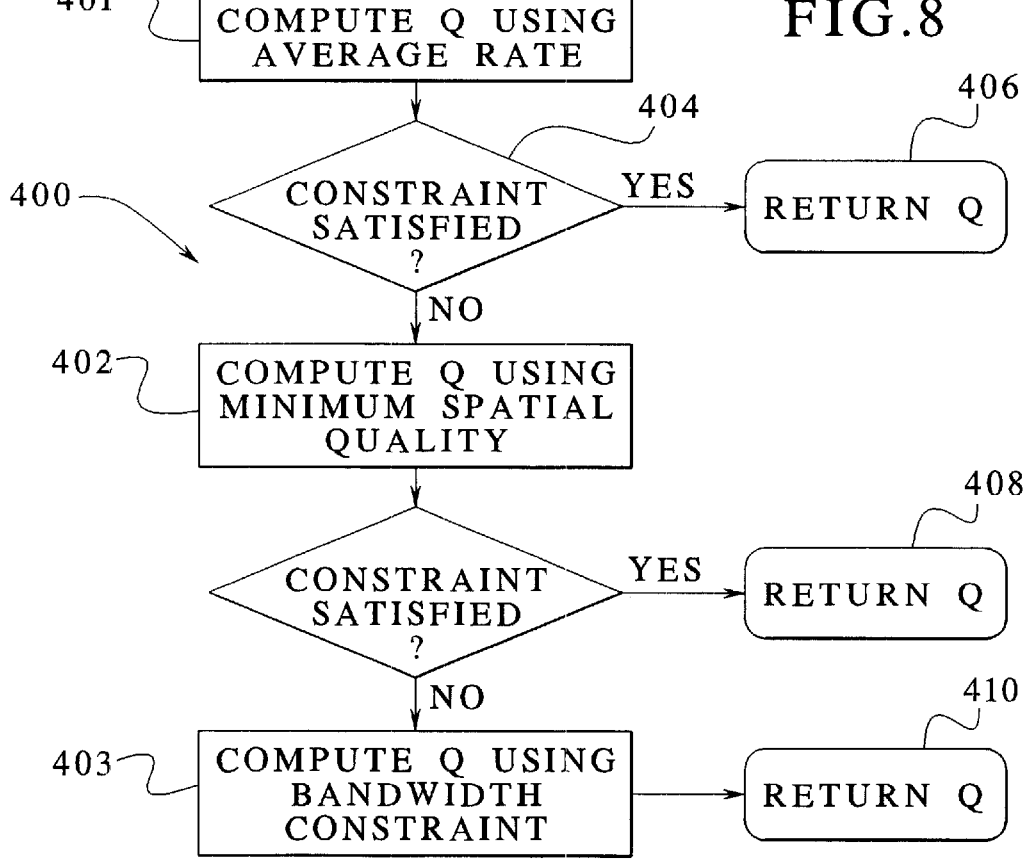

METHOD AND A DEVICE FOR TRANSMISSION OF A VARIABLE BIT-RATE COMPRESSED VIDEO BITSTREAM OVER CONSTANT AND VARIABLE CAPACITY NETWORKS

RELATED APPLICATION DATA

This application claims the benefit of U.S. Provisional Application Ser. No. 60/120,230, filed Feb. 16, 1999.

BACKGROUND OF THE INVENTION

The present invention relates to a method and a device for transmitting a video bitstream over networks. More specifically, the present invention relates to a method and a device for the transmission of a variable bit-rate compressed video bitstream over both constant and variable capacity networks.

Digitally compressed video is now widely used for one and two-way communication of visual information. This is largely facilitated by the existence of a number of international standards for compressed digital video, including MPEG-1, MPEG-2, and MPEG-4. These standards specify a particular bitstream syntax for representing visual information in a binary fashion. The compressed bitstream may then be communicated over a specific channel.

The bit-rate of a compressed video bitstream is a function of time. This function depends mainly on two factors. The first factor is the amount of information contained in the original video sequence at each time period that the compression algorithm analyzes. The second factor is the amount of data that is deemed insignificant and discarded by the compression algorithm. If the goal of the compression algorithm is to achieve constant-visual quality across the whole video sequence, the bit-rate of the resulting bitstream usually varies over time. However, the physical networks that are used to transmit these video bitstreams may either be of constant or variable capacity.

For transmission of compressed video sequences over constant capacity networks, such as circuit switched wireline or wireless phone systems, existing rate control mechanisms usually enforce the constant bitrate constraint and generate variable-quality bitstreams. This method has the side effect of producing poor quality compressed video segments for scenes with large motion while wasting transmission bandwidth for scenes with static objects.

The delivery of video over emerging variable capacity wireline and wireless communication systems entails a number of new hurdles to be crossed. One critical element of these new systems is that they provide a means for variable bit-rate communication. Whether packet-switched communication over a corporate LAN or variable rate CDMA wireless communication, this critical component of the communication system should be exploited to maximize the quality of delivered video. Existing rate control methodologies do not effectively exploit the variable and dynamically changing bandwidth characteristics of modern communication systems. Accordingly, the quality of encoded video is often unnecessarily poor in digital video delivery systems.

A need, therefore, exists for an improved method and device for transmitting a variable bit-rate compressed video bitstream over constant and variable capacity networks that overcome the problems associated with existing methods and devices.

SUMMARY OF THE INVENTION

The present invention addresses the problems of producing and delivering constant quality bitstreams over channels of constant or variable bit-rate capacity. The present invention may be integrated within any standardized video coding system, but the preferred embodiment is integrated within the MPEG-4 standard. The method and device relate to achieving constant quality over both constant capacity and variable capacity networks. For constant capacity networks, the method of the present invention re-distributes the coded bits in a constant-quality variable bit-rate bitstream to construct a constant bit-rate bitstream. The re-distribution of the coded bits are done in an MPEG-4 standard-compliant fashion so that the resulting bitstream may be decoded by any MPEG-4-compliant video decoder as a variable quality bitstream. However, a matching decoder at the receiver, consistent with the present invention, may be used to restore the original variable bit-rate bitstream so that the constant-quality criterion is maintained.

For variable capacity networks, the method and device relate to achieving constant quality as described by a metric that incorporates both spatial and temporal visual quality. The method incorporates user, network and channel parameters in controlling the bit-rate while encoding video material. Network parameters including average packet loss rate, average packet size, number of users on the network and statistics of individual users (mean and standard deviation of the bit-rate of connected sessions) are used to choose and adapt the free parameters of the rate controller. The method and device allow feedback from the receiving terminal to influence the encoding parameters. These features provide for context-based rate control that may adapt to the activity and nature of the coded scene. The method and device may be used for real-time or off-line coding, and all automatic parameter computations may be overridden by the user during run-time.

To this end, in an embodiment, a method for controlling a digitally compressed video bitstream for achieving constant quality video delivery over a constant capacity channel is provided. The method comprises the steps of: providing an encoder; providing a digitally compressed video bitstream having frames; analyzing a quantity of bits used to compress each frame; and repositioning an excess set of bits associated with an original bitstream position in a first frame to a predetermined bitstream field associated with a second frame having a lesser number of bits than the first frame to create an altered bitstream.

In an embodiment, the altered bitstream is delivered at a constant rate over a constant capacity channel.

In an embodiment, the altered bitstream is parsed. The bits associated with the predetermined bitstream field associated with the excess set of bits are buffered and the excess bits are re-positioned into the original bitstream position.

In an embodiment, the bitstream is decoded to generate a constant quality video sequence.

In an embodiment, the excess set of bits associated with the original bitstream position is a set of enhancement layer bits.

In an embodiment, the bitstream is an MPEG standardized bitstream.

In an embodiment, the predetermined bitstream field is a user-defined data field.

In an embodiment, the bitstream has a variable bit-rate.

In an embodiment, the constant capacity channel has a bit budget for each frame and further wherein each frame has at most the number of bits allowed by the bit budget.

In another embodiment of the present invention, a method for controlling a digitally compressed video bitstream for achieving constant quality video delivery over a variable capacity channel is provided. The method comprises the steps of: providing a network; providing a bitstream; providing a user in the network; analyzing parameters based on preferences of the user; managing a temporal frame rate of the bitstream based on the parameters; changing a quantization of residual frames based on the parameters; providing a coding process; and splitting the coding process into a layered coding process based on some of the parameters.

In an embodiment, the parameters relate to quality of service preferences of the user.

In an embodiment, the parameters include at least one of temporal quality measures, spatial visual quality measures, network capacity, network availability, enhanced feature compliance and a number of users supported by the network.

In an embodiment, the enhanced feature compliance includes scalability.

In an embodiment, some of the parameters include a range of enhanced feature compliance supported by the network and a number of users in the network.

In an embodiment, a network manager is provided. The preferences of the user are communicated via a channel to the network manager.

In another embodiment of the present invention, a device for controlling a digitally compressed video bitstream for achieving constant quality video delivery over a constant capacity channel is provided. The device has an encoder for analyzing a digitally compressed video bitstream having frames to determine a quantity of bits used to compress each frame and further wherein the encoder repositions an excess set of bits associated with an original bitstream position in a first frame to a predetermined bitstream field associated with a second frame having a lesser number of bits than the first frame to create an altered bitstream.

In an embodiment, a decoder is provided for parsing the altered bitstream wherein the decoder buffers the bits associated with the predetermined bitstream field associated with the excess set of bits and further wherein the decoder repositions the excess set of bits into the original bitstream position.

In another embodiment of the present invention, a device is provided for controlling a digitally compressed video bitstream for achieving constant quality video delivery over a variable capacity channel. The device has an analyzer for analyzing a digitally compressed video bitstream wherein the analyzer analyzes parameters based on preferences of a user. A manager is provided for managing a temporal frame rate of the bitstream based on the parameters. Means is provided for changing a quantization of residual frames in the bitstream. A splitter is provided for splitting a coding process into a layered coding process based on some of the parameters.

In another embodiment, the parameters include at least one of temporal visual quality measures, spatial visual quality measures, network capacity, network availability, enhanced feature compliance, and a number of users supported by the network.

In an embodiment, some of the parameters that are used to split the coding process into the layered process include a range of enhanced feature compliance supported by a network and a number of users in the network.

It is, therefore, an advantage of the present invention to provide a method- and a device for transmitting a variable bit-rate compressed video bitstream over constant and variable networks.

Another advantage of the present invention is to provide a method and a device that may be integrated within any standardized video coding system.

Additionally, an advantage of the present invention is to provide a method and a device that achieve constant quality over both constant capacity and variable capacity networks.

A still further advantage of the present invention is to provide a method and a device that redistribute the variable coded bits in a bitstream to construct a constant bit-rate bitstream.

Moreover, an advantage of the present invention is to provide a method and a device that incorporate user, network and channel parameters in controlling the bit-rate while encoding video material for variable capacity networks.

A further advantage of the present invention is to provide a method and a device that allow feedback from the receiving terminal to influence the encoding parameters.

A still further advantage of the present invention is to provide a method and a device that provide for context-based rate control which can adapt to the activity and nature of the coded scene.

In addition, an advantage of the present invention is to provide a method and a device that may be used for real-time or off-line coding whereby all automatic parameter computations may be overridden by the user during run time.

Additional features and advantages of the present invention are described in, and will be apparent from, the detailed description of the presently preferred embodiments and from the drawings.

BRIEF DESCRIPTION OF THE DRAWINGS

FIG. 3 illustrates a flowchart of a method for modifying a variable bit-rate bitstream for a constant bit-rate channel in an embodiment of the present invention.

FIG. 4 illustrates a flowchart of a method for modifying a variable bit-rate bitstream for a variable bit-rate channel in an embodiment of the present invention.

FIG. 5 illustrates a communication network utilizing an embodiment of the present invention in a video coder.

FIG. 8 illustrates a flowchart of a spatial quality management method in an embodiment of the present invention.

DETAILED DESCRIPTION OF THE PRESENTLY PREFERRED EMBODIMENTS

The present invention generally relates to a method and a device for transmitting a video bitstream over networks. More specifically, the present invention relates to a method and a device for the transmission of a variable bit-rate compressed video bitstream over both constant and variable capacity networks.

Figure 1:
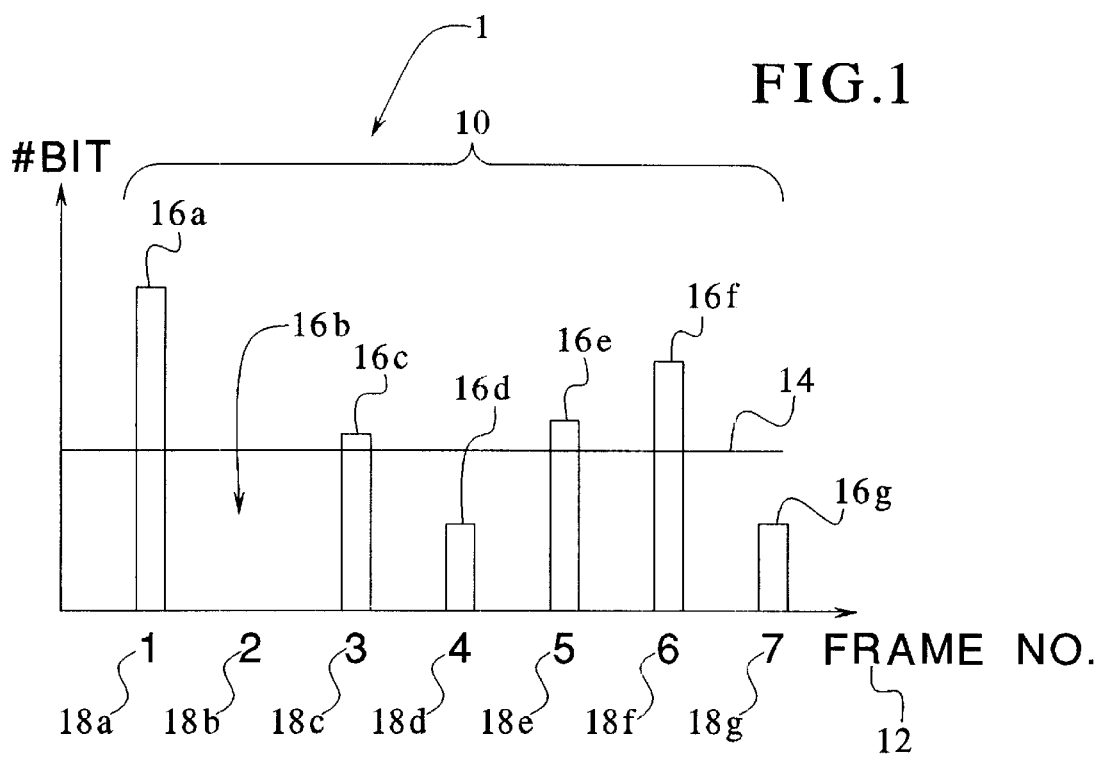
FIG. 1 illustrates a chart of a variable bit-rate bitstream in an embodiment of the present invention.

Referring now to the drawings, wherein like numerals refer to like parts, FIG. 1 illustrates a chart 1 of coded bits 10 as a function of frame number 12, in terms of bits per frame that may be contained in a bitstream. In this example, a variable number of bits 16a–16g may be required to encode each frame 18a–18g. A skipped frame 18b is also shown. A bit budget per frame 14 may be illustrated that may be constant in a constant capacity network. The variable number of bits per frame 10 in FIG. 1 may result from differing amounts of motion and texture within a scene over time and further may result from the algorithms typically used to perform standardized video compression.

Figure 2:
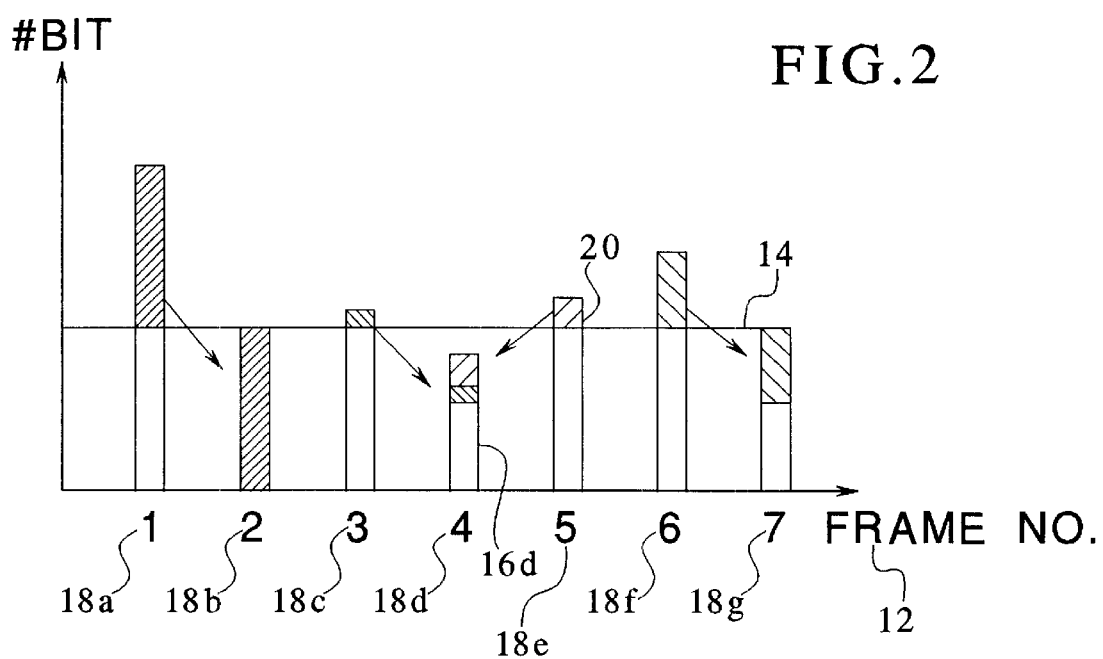
FIG. 2 illustrates a chart of a variable bitstream modified for transmission over a constant bit-rate channel in an embodiment of the present invention.

FIG. 2 illustrates the same series of coded bits re-distributed over the same frames 18a–18g in time as shown in FIG. 1. The re-distribution considers utilizing skipped frames in the variable rate bitstream to place bits from neighboring frames into the bitstream prior to or otherwise adjacent to their actual decode times. This method may be used with storage and delivery of content which has been encoded off-line. The information may be stored in the bitstream in such a way that it can be delivered and decoded over a constant bit-rate channel with constant quality. This capability may come from the storage of some bits generated from future frames being stored in special user-defined data fields in prior or otherwise adjacent frames. For example, in FIG. 2, excess bits 20 associated with Frame 5 (18e) are shown with bits 16d tagged from Frame 4 (18d). Therefore, the excess bits 20 representing the frame at time t+1 (where, for example, t=Frame 4 (18e)), may be transmitted along with the bits 16d associated with the frame at time t (Frame 4 (18d)) because excess bandwidth may be available for transmission for that frame.

Referring now to FIG. 3, a rate control method is illustrated in a flowchart 50. The method may include a step 54 that may analyze the number of bits used to code each frame from a variable bit-rate bitstream. The bit budget for the transmission of each frame over a constant bit-rate channel may be fixed. If a frame requires more bits than the bit budget allows, a predetermined set of its bitstream coefficients may be attached to some prior or otherwise adjacent frames that require less bits than the per-frame bit budget, using the user-defined data field via step 56. The user defined data field may be a bitstream field present in the MPEG-4 video coding standard, for example. The steps 54,56 may occur within an encoder 52. The bitstream may then be transmitted via step 58.

Further, the method may include a step 62 that may parse out the bitstream data and buffer the data until the bitstream data of the corresponding frame arrives. The buffered bitstream coefficients may then be unpackaged via step 64. Step 66 may merge the bitstream coefficients into the bitstream data before the data is passed to the next layer of the video decoder. The steps 62–66 may take place within a decoder 60.

The method may be used with any video decoder even if the user-defined data bits are not decoded because the standards using user-defined fields may require the decoders to parse over those fields if their meaning is unknown. When using the MPEG-4 video coding standard, scalability may be used to generate multiple layers of video information in a single bitstream. These layers may be known as base layers and enhancement layers. Information from an enhancement layer may be sent in the user-defined data field of a prior frame in the bitstream to distribute the delivery time of bits for consistency with a constant bit-rate channel.

For variable capacity networks, the present invention may provide a method and a device for automatically managing the bit expenditures associated with a digitally compressed video bitstream. The method may incorporate user, network and channel parameters in controlling the bit-rate while encoding video material. Network parameters may include average packet loss rate, average packet size, number of users' on the network and/or statistics of individual users (such as mean and standard deviations of the bit-rate of connected sessions). The network parameters may be used to choose and adapt the free parameters of the rate controller. The method may allow feedback from the receiving terminal to influence the encoding parameters. These features may provide context-based rate control which may adapt to the activity and nature of the coded scene. The method may be used for real-time or off-line coding, and all automatic parameter computations may be overridden by the user during run-time.

As illustrated in FIG. 4, a flowchart 70 of a method for managing bit expenditures associated with a digitally compressed video bitstream for variable capacity networks may be provided. The method may include a step 72 that may analyze users requested quality of service (QoS) including temporal and spatial visual quality measures, network capacity and availability, enhanced feature compliance, such as, for example, scalability, and number of users supported by the network.

A step 74 may manage the temporal frame rate of a coded video sequence based on the users' requested temporal QoS, network capacity and availability, and the enhanced feature compliance and number of users supported by the network. Next, a step 76 may change the quantization of the residual frames based on the users, requested spatial QoS, network capacity and availability, and the enhanced feature compliance and number of users supported by the network.

Further, a step 78 may manage splitting the coding process into a layered coding process based on the range of enhanced feature compliance supported by the communication network and number of users in the network.

FIG. 5 illustrates a visual communication network 100. Multiple users 101 may communicate their preferences over a channel 103 to a network manager 105, who may then communicate the preferences of the users, network information, and channel information 106 to a bit manager 107 in a video coding system 109. Other information may be transmitted to the bit manager 102 as my be apparent to those skilled in the art. The bit manager 107 may supervise automatic adaptation of the video coding system to feedback from the network manager 105.

Figure 6:
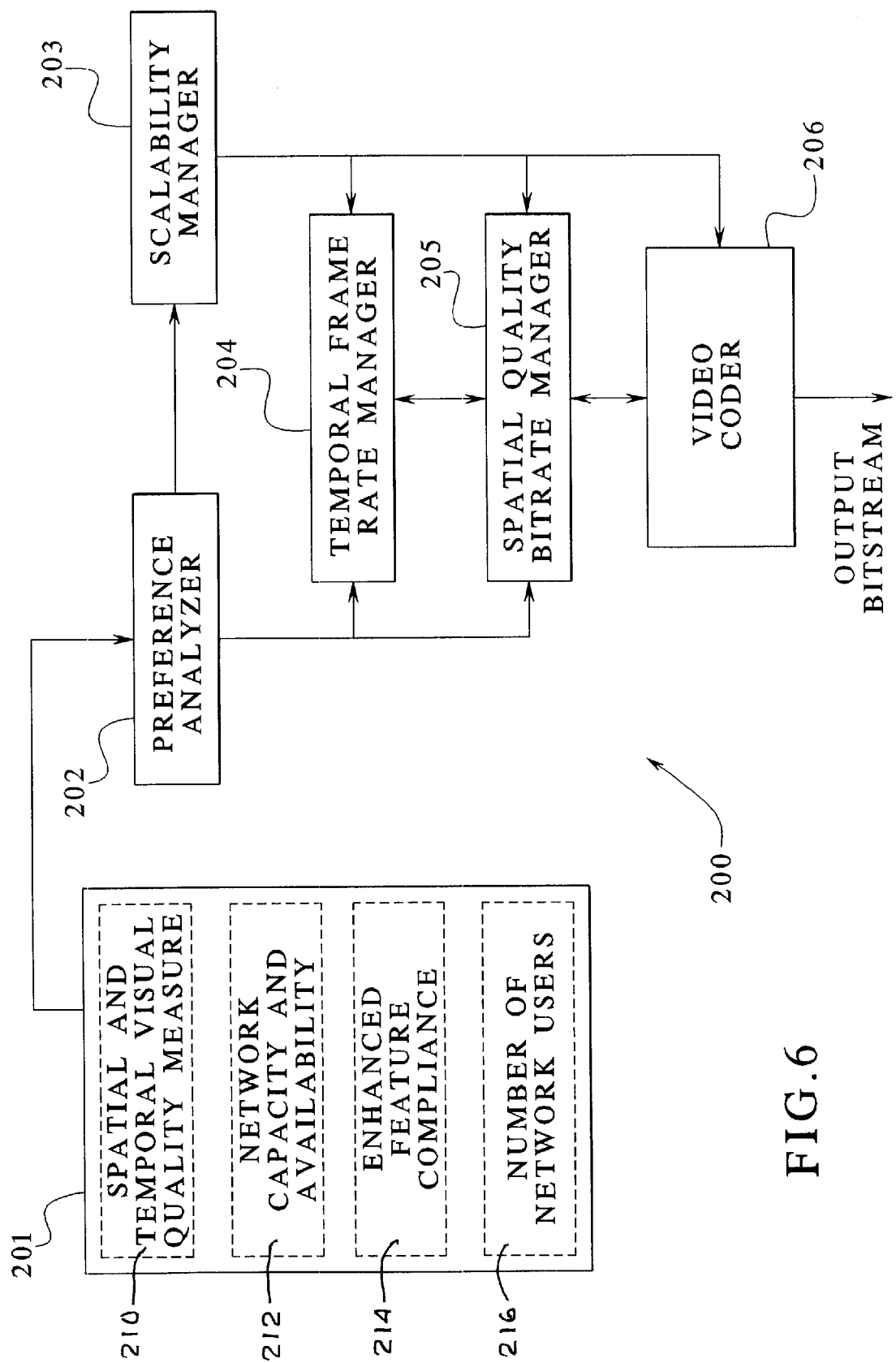
FIG. 6 illustrates a flowchart of a preferred embodiment of the bit manager stage in an embodiment of the present invention.

FIG. 6 illustrates a flowchart 200 of a representation of the bit manager 107, as shown in FIG. 5. The flowchart 200 may include a list of network and user preferences 201 which may include a spatial and temporal visual quality measure 210, network capacity and availability 212, enhanced feature compliance 214, and number of users supported by the network 216. Enhanced feature set compliance 214 may refer to the preference for scalability in the video bitstream. The network and user preferences 201 may be coupled to serve as input to both a preference analyzer 202 and a scalability manager 203. The preference analyzer 202 may be configured to determine the capabilities of a network and to input those parameters to a temporal frame rate manager 204 and a spatial quality bit-rate manager 205.

As noted previously, the preference analyzer 202 may be coupled to serve as input to a scalability manager 203. The scalability manager 203 may process the enhanced feature compliance 214 provided by the preference analyzer 202 and may determine the optimal modes of scalability to be used for a video coder 206 that may produce an output bitstream. The modes of scalability may include temporal, spatial, and SNR scalability. These elements may be supported by existing international video coding standards. The temporal frame rate manager 204 may determine a dropping or coding state of frames processed by the bit manager 107. The spatial quality manager 205 may determine the quantization parameters used for residual frames processed by the bit manager 107.

Figure 7:
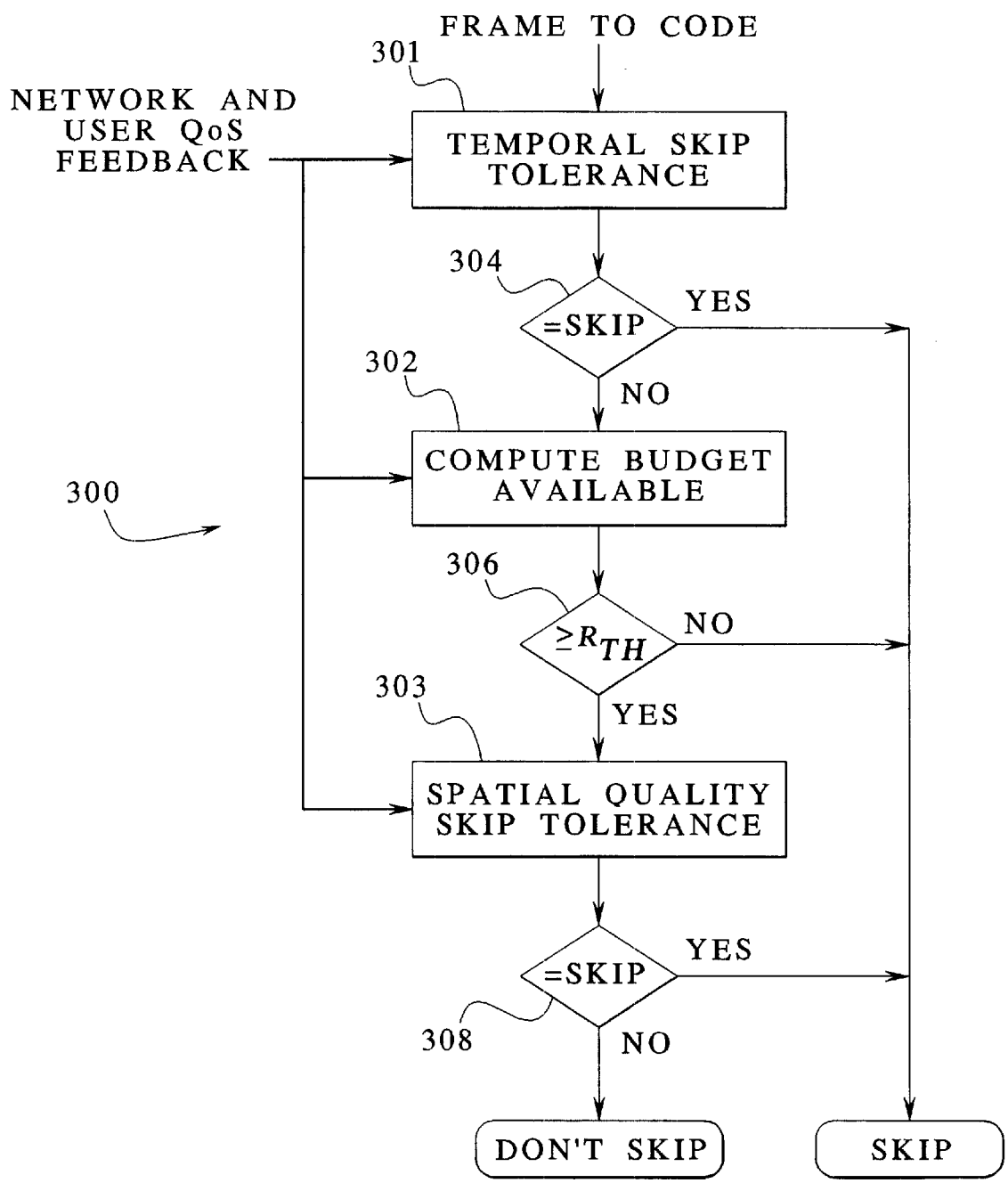
FIG. 7 illustrates a flowchart of the frame skipping method in an embodiment of the present invention.

FIG. 7 illustrates a flowchart 300 of a method for frame skipping used by the temporal frame rate manager 204 as illustrated in FIG. 6. A frame may be skipped according to the tolerance of temporal visual quality of the users, available network capacity, and users' tolerance to spatial visual quality. Step 301 may compute a temporal skip tolerance based on a quality measure that may incorporate sensitivity to temporal characteristics of coded video. The temporal skip tolerance may also be based on the network and user QoS guarantees. Spatial tolerance may be a function of motion in the video, targeted bit-rate, targeted frame rate and input of the users. Further, spatial tolerance may be non-linear and may depend on the video content. A user may choose to set the spatial visual tolerance to a constant value. The instantaneous frame rate should not change by more than 20 percent, but this parameter may be adjusted by the user based on scene content.

If, after step 301, a decision has not been made to skip the frame via step 304, another test may be conducted based on a computed bit-rate availability (step 302). If the available capacity or bit budget is R(n) and if $R(n) \leq R_{TH}$, where $R_{TH}$ is a rate threshold, the frame may be skipped. Step 306 may determine whether the frame may be skipped in step 303 and the requirements of coding the frame subject to the spatial visual quality tolerance may be estimated. The spatial visual quality tolerance may result from psycho-visual studies. Further, they may depend on the network capacity and the input of the users. If the frame cannot be coded using the available means, the frame may be skipped via step 308.

For example, when using scalar quantizers, the spatial quality may be determined by the quantizer used (Q). The relation between Q and the bit budget may be modeled as Q=g(R). The quality can be estimated by following the steps of:

1. Find Q such that R satisfies the average network capacity constraints. If Q is within the quality constraints, the frame may not be skipped.
2. Compute Q such that R satisfies maximum network capacity constraints. If Q is within the quality constraints, the frame may not be skipped.

If both tests fail, the frame may be skipped. These tests may be weighted according to their importance for the application or according to the preferences of the users.

If the frame skipping method decides to code the frame, the frame data may be passed to the spatial quality manager, which may follow a method described in a flowchart 400 illustrated in FIG. 8. The quantizer value may be estimated based on the sum of absolute differences (SAD) of the previous coded frame in causal systems and the SAD of the current frame in non-causal systems.

For the scalar quantizer example, the following steps may be used. Step 401 illustrates computing Q based on the average available budget. If Q is within the spatial visual constraints via step 404, the computed Q may be passed to the video coder via step 406. In step 402, if the value of Q of the prior step does not satisfy the visual constraints, the value of Q that may satisfy minimum spatial visual constraints and a network capacity range may be computed and passed to the video coder via step 408. In step 403, if there is no Q value that satisfies visual and bandwidth constraints simultaneously, a Q may be chosen that satisfies only the network bandwidth constraints, and the Q may be passed to the video decoder via step 410.

The coding elements and methods reflected in FIGS. 5–8 may combine to result in the generation of video which may be constant in quality or may change very little in quality over time. The bit-rate may change in a variable way, but may be bounded by the parameters provided by the user and the network. The present invention may thus serve to enable variable bit-rate delivery of video over both wired and wireless networks with special adaptivity to changing bandwidth and user constraints. This may be a critical element of modern visual communication systems, which may be largely packet-switched in nature, and thus have a strong need for optimal rate control adapted to the variable channel rates associated with such systems.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A method for controlling a digitally compressed video bitstream for achieving constant quality video delivery over a constant capacity channel, the method comprising the steps of:

providing an encoder;

providing a digitally compressed video bitstream having frames;

analyzing a quantity of bits used to compress each frame;

imposing a constant bit budget per frame to optimize and control visual and audio quality; and repositioning an excess set of bits above the bit budget associated with an original bitstream position in a first frame to a predetermined bitstream field associated with a second frame having a lesser number of bits than the first frame to create an altered bitstream that has a more constant quality which substantially meets the imposed bit budget.

2. The method of claim 1 further comprising the step of: delivering the altered bitstream at a constant rate over a constant capacity channel.

3. The method of claim 1 further comprising the step of:

parsing the altered bitstream;

buffering the bits associated with the predetermined bitstream field associated with the excess set of bits; and repositioning the excess bits into the original bitstream position.

4. The method of claim 1 further comprising the steps of:

decoding the bitstream to generate a constant quality video sequence.

5. A method of claim 1, wherein the excess bits associated with the first bitstream frame position is a set of complimentary layer bits for subsequent of prior bitstream frames.

6. The method of claim 1 wherein the bitstream is an MPEG standardized bitstream.

7. The method of claim 1 wherein the predetermined bitstream field is a user-defined data field.

8. The method of claim 1 wherein the bitstream has a variable bit-rate.

9. A method for controlling a digitally compressed video bitstream for achieving constant quality video delivery over a variable capacity channel, the method comprising the steps of:

providing a network;

providing a bitstream;

providing a user in the network;

analyzing parameters based on preferences of the user;

providing for an override of parameters by the user during run time;

allowing feedback to influence the parameters;

managing a temporal frame of the bitstream based on the parameters;

managing a spacial frame of the bitstream based on the parameters;

changing a quantization of residual frames based on the parameters;

providing a coding process both real-time and off-line; and splitting the coding process into a layered coding process based on some of the parameters.

10. The method of claim 9, wherein the parameters relate to quality of service preferences of the user.

11. The method of claim 9, wherein the parameters include at least one of temporal quality measures, spatial visual quality measures, network capacity, network availability, enhanced feature compliance and a number of users supported by the network.

12. The method of claim 11 wherein the enhanced feature compliance includes scalability.

13. The method of claim 9, wherein some of the parameters include a range of enhanced feature compliance supported by the network and a number of users in the network.

14. The method of claim 10, further comprising the steps of:

providing a network manager; and communicating the preferences of the user via a channel to a network manager.

15. A device for controlling a digitally compressed video bitstream for achieving constant quality video delivery over a constant capacity channel, the device comprising:

an encoder for analyzing a digitally compressed video bitstream having frames to determine a quantity of bits used to compress each frame;

wherein excess bits are stored in special user-defined data fields in prior and/or adjacent frames;

wherein the encoder repositions an excess set of bits associated with an original bitstream position in a first frame and/or a subsequent frame to a predetermined bitstream field associated with a second frame having a lesser number of bits than the first frame and/or the subsequent frame to create an altered bitstream.

16. The device of claim 15, further comprising:

a decoder for parsing the altered bitstream wherein the decoder buffers the bits associated with the predetermined bitstream field associated with the excess set of bits and further wherein the decoder repositions the excess set of bits into the original bitstream position.

17. A device for controlling a digitally compressed video bitstream for achieving constant quality video delivery over a variable capacity channel, the device comprising:

an analyzer for analyzing a digitally compressed video bitstream wherein the analyzer analyzes parameters based on preferences of a user;

providing for an override of parameters by the user during run time;

allowing feedback to influence the parameters;

a manager for managing a temporal frame rate of the bitstream based on the parameters;

means for changing a quantization of residual frames in the bitstream; and a splitter for splitting a coding process into a layered coding process based on some of the parameters.

18. The device of claim 17, wherein the parameters include at least one of temporal visual quality measures, spatial visual quality measures, network capacity, network availability, enhanced feature compliance, and a number of users supported by the network.

19. The device of claim 17, wherein some of the parameters used to split the coding process into the layered process include a range of enhanced feature compliance supported by a network and a number of users in the network.

* * * * *